United States Patent
Friedmann (10) Patent No.: US 7,108,626 B2
(45) Date of Patent: Sep. 19, 2006

(54) DRIVE ASSEMBLY

(75) Inventor: Oswald Friedmann, Lichtenau (DE)

(73) Assignee: LuK Lamellen und Kupplungsbau Beteiligungs KG, Bohl (DE)

( * ) Notice: Subject to any disclaimer, the term of this patent is extended or adjusted under 35 U.S.C. 154(b) by 157 days.

(21) Appl. No.: 10/490,906

(22) PCT Filed: Sep. 19, 2002

(86) PCT No.: PCT/DE02/03512

§ 371 (c)(1),
(2), (4) Date: Oct. 3, 2004

(87) PCT Pub. No.: WO03/026911

PCT Pub. Date: Apr. 3, 2003

(65) Prior Publication Data

US 2005/0039572 A1  Feb. 24, 2005

(30) Foreign Application Priority Data

Sep. 26, 2001 (DE) ................ 101 47 415
Mar. 18, 2002 (DE) ................ 102 11 864

(51) Int. Cl.
*F16H 3/72* (2006.01)
(52) U.S. Cl. ........................................... 475/8
(58) Field of Classification Search ............ 475/5, 475/8; 903/909; 74/125.5; 477/3, 5
See application file for complete search history.

(56) References Cited

U.S. PATENT DOCUMENTS

| 3,951,005 | A | * | 4/1976 | Dahlstrom ................. 74/125.5 |
| 6,269,895 | B1 | | 8/2001 | Tanuguchi et al. ......... 180/65.2 |
| 6,491,602 | B1 | | 12/2002 | Höhn ........................... 477/5 |

FOREIGN PATENT DOCUMENTS

| DE | 43 42 735 A1 | 6/1995 |
| DE | 196 31 243 C2 | 5/2003 |
| EP | 0 908 343 A2 | 4/1999 |
| WO | WO 00/59750 | 10/2000 |

OTHER PUBLICATIONS

"Variable-eccentric CVT," *Automotive Engineer*, vol. 18, No. 2, Apr./May 1993, Bury St. Edmunds, United Kingdom.

* cited by examiner

*Primary Examiner*—Dirk Wright
(74) *Attorney, Agent, or Firm*—Alfred J. Mangels (57) ABSTRACT

A drive assembly for a motor vehicle having a stepless transmission including a driven input shaft coupled to an engine and at least one output shaft. The input and output shafts are drivingly connected through an eccentric drive provided on the input shaft. A freewheel system is provided on the output shaft. The eccentric drive and the freewheel system are interconnected by at least one connecting element. An electrical machine is selectively connected through coupling elements to the input shaft of the transmission, to the engine, or simultaneously to the input shaft and to the engine.

45 Claims, 4 Drawing Sheets

DRIVE ASSEMBLY

BACKGROUND OF THE INVENTION

1. Field of the Invention

The invention concerns a drive arrangement for a motor vehicle composed of at least one transmission driveable by an engine that has a drive shaft coupleable with the engine, for example a transmission input shaft, as well as at least one driven shaft, for example a transmission output shaft, which are drivingly connected with one another.

2. Description of the Related Art

A transmission for such a drive arrangement has been proposed in WO 90/05252, for example. An adjustable eccentric drive arrangement is provided by that transmission on an input shaft that is driveable by an engine and forms a drive shaft relative to the transmission, wherein the eccentric drive arrangement is connected with two driven shafts through connecting-rod-like connecting elements that form output shafts relative to the transmission. The driven shafts are driven utilizing freewheel units, which are provided between the connecting elements and those shafts.

SUMMARY OF THE INVENTION

The present invention is based upon the object of improving drive arrangements, especially for motor vehicles, with a transmission that operates according to the previously-described basic principle in such a way that an optimal operation can be made possible. It should in particular be ensured by the invention that a secure mode of operation of a motor vehicle is possible. Furthermore, an energy-saving or fuel-saving operation of the motor vehicle should be made possible by the configuration of the drive arrangement in accordance with the invention. An additional object of the invention is to enable a compact configuration of the drive arrangement, especially the transmission contained therein.

The objects underlying the present invention are at least partially accomplished in that the drive arrangement includes an electrical machine, which can be selectively connected through coupling devices either only with the output side of the transmission or only with the engine or, however, simultaneously with the output side and the engine. The output side of the transmission can thereby be formed by at least one driven shaft, and the engine by an internal combustion engine. The coupling devices connecting the at least one rotor of the electrical machine with the output side of the transmission and/or with the engine can be formed, for example, by freewheel units or by positive locking couplings, such as, for example, gear couplings or, however, by frictionally-engaged couplings. Nevertheless, a combination of connecting devices of that type can also be utilized. Freewheel couplings with clamping bodies or loop springs can also be utilized as freewheel couplings. Furthermore couplings based on the brake band principle can be utilized.

Through the previously-mentioned arrangement it can be ensured that at least during deceleration, for example of a motor vehicle or the drive arrangement, retardation can take place by means of the electrical machine operated as generator and/or an eddy current brake. The retarding torque or the braking power can then be enlarged in a simple way by connecting the engine to the electrical machine.

In an especially advantageous way the electrical machine can be connected with the output side of the transmission through a transmission ratio unit. The transmission ratio unit can thereby have a fixed transmission ratio stage, such as, for example, a gear stage, or it can be formed by such. The transmission ratio unit can nevertheless also have a chain drive and/or a toothed belt drive. When utilizing a gear stage, it can be suitable if at least one intermediate gear is utilized for adapting the direction of rotation.

It can also be suitable for many applications if the transmission ratio unit provided between the electrical machine and the output side of the transmission has a variable transmission ratio in that, for example, the transmission ratio unit includes a shiftable multi-step reduction gear or a stepless transmission. When utilizing a stepless transmission, it can be constructed as a friction transmission or a stepless, belt-driven conical pulley transmission.

Although it can be suitable if the drive means provided between the electrical machine and the engine enables a variable transmission ratio, it is especially advantageous for many applications if those drive means ensure a transmission-ratio-free connection or connection possibility, so that the electrical machine and engine can then be directly connected and can then rotate at the same rotational speed. When utilizing a variable transmission ratio between the electrical machine and engine, that can be constructed in a similar manner as the already-mentioned connection means between the electrical machine and the output side of the transmission.

Although for many applications the electrical machine installed is designed or operable only as a motor or else only as a generator, it would be especially advantageous for most applications to use an electrical machine that can be operated as a motor as well as a generator. Utilization of the electrical machine as a motor enables it to be utilized as a starter for an internal combustion engine and/or as a drive engine for a motor vehicle. The output design of the electrical machine can thereby take place in such a way that it can be utilized merely as an auxiliary motor, which supports the internal combustion engine, and/or it can be utilized at least part of the time as the sole drive for the motor vehicle.

A mode of operation of the electrical machine as generator enables, for example, energy recuperation when driving downhill or during deceleration of a motor vehicle. Furthermore, a braking or a retardation of the entire motor vehicle and/or the internal combustion engine can be ensured by the generator function of the electrical machine. The electrical machine can have an output in the order of from 2 to 15 kW, whereby for most applications the electrical machine can have an output in the order of magnitude of from 6 to 12 kW, so that it can then be operated as a starter for the internal combustion engine as well as at least an auxiliary drive and brake for the motor vehicle.

To the extent that the energy developed during recuperation operation of the electrical machine can no longer be stored, because, for example the batteries are fully charged, it can be suitable in those operating conditions to additionally use the electrical machine for cooling and/or for heating purposes. For that purpose, the electrical machine can be constructed in such a way that it is maintained at an acceptable temperature by means of the cooling system of the engine. The electrical machine can, for example, have a fluid loop that is connected to the cooling system of the engine. Cooling of the electrical machine also makes it possible to design it in such a way that it can be utilized as an eddy current brake. The dissipation of the excess energy possibly developed can also take place by means of an electrical heating system, which, for example, is coupled with the cooling system of the internal combustion engine. During braking operation of the electrical machine, the excess energy can be dissipated without problems in the cooling system of the engine, since during deceleration of the motor vehicle the internal combustion engine produces only little heat.

Through the configuration of a drive arrangement in accordance with the invention, it can be ensured that the electrical machine can be drivingly connected with the output side of the transmission as well as with the engine, so that during deceleration of the motor vehicle the braking action of the engine and the electrical machine complement each other. In that way, it is possible to brake the motor vehicle by means of the electrical machine or the internal combustion engine, although, in those conditions by means of the connecting devices that are operative between the eccentric drive and the freewheel unit, possibly no output can be transmitted because of the existing freewheel function of the freewheel unit.

An especially advantageous arrangement, which can ensure a compact construction of a drive, consists in arranging the electrical machine coaxially relative to the drive shaft of the transmission. Thereby that drive shaft can form the input shaft of the transmission and can be arranged coaxially to the crankshaft of the internal combustion engine. Depending upon the application, the electrical machine can be arranged on the side of the drive shaft facing away from the engine, or else axially between the engine and the transmission.

In an advantageous way, the transmission ratio unit provided between the output side of the transmission and the electrical machine can be designed in such a way that the engine and the electrical machine rotate at least near the maximum allowable rotational speed at maximum speed of the motor vehicle. In that way, over-speeding of the engine constructed as an internal combustion engine should especially be avoided.

The transmission ratio unit between the output side of the transmission and the electrical machine can also be advantageously constructed in such a way that, at the maximum speed of the motor vehicle, the electrical machine rotates at a rotational speed that is greater than the rotational speed of the engine at its highest power output.

The coupling means connecting the at least one rotor of the electrical machine with the output side of the transmission on one hand, and with the engine on the other hand, such as, for example, freewheel units, are appropriately arranged and connected in such a way that the electrical machine is driven by a more rapid drive existing at a certain point in time. That means, for example, that if the internal combustion engine momentarily ensures a more rapid drive of the electrical machine than the drive means that exist between the output side of the transmission and the electrical machine, the electrical machine is driven by the engine, and by the transmission side in the opposite case.

Nevertheless, it is especially appropriate if the shiftable coupling means, which on one hand ensure a connection between the transmission output side and the electrical machine and on the other hand between the engine and the electrical machine, are arranged and connected in such a way that the electric motor can only be driven by the momentarily faster drive when needed, so that in some operating conditions the electrical machine can also be driven by the momentarily slower drive. Therefore, a selective driving mode of the electrical machine is possible as a function of certain operating parameters.

It can be especially suitable for the construction of the drive arrangement if the actuation unit for adjusting the eccentric drive provided on the drive shaft is provided coaxially to the rotor of the electrical machine. An especially space-saving arrangement can result in that the rotor of the electrical machine is configured at least partially hollow, and the actuation unit for the eccentric drive is at least partially accommodated within the same. In an advantageous way, the actuation unit can thereby be constructed as an electric motor, whereby a transmission ratio stage, which can, for example, be constructed planetary-transmission-like, can be provided between the then existing adjusting motor and the actual eccentric drive.

The configuration of a drive arrangement in accordance with the invention enables the use of a stepless transmission, which can be manufactured in an especially simple and rational manner. In that way, a compact construction of the drive arrangement is possible whereby nevertheless high power can be transmitted. Furthermore, through the structure of the drive arrangement in accordance with the invention, kinematics and dynamics of the drive train can be ensured, which at least diminishes in a simple manner free forces of inertia or free torques as a consequence of transmission or machine parts moving back and forth.

The eccentric drive provided on the drive shaft or transmission input shaft can advantageously have a guide region that is arranged eccentrically opposite the axis of rotation of the drive shaft, and on which an eccentric component is supported, on which, in turn, the connecting element is rotatably supported. Such a construction makes possible in a particularly simple way a stepless adjustment of the eccentricity of the eccentric drive by rotating the eccentric component relative to the guide region likewise arranged eccentrically relative to the axis of rotation of the drive shaft. It can be particularly advantageous if the eccentric drive has several eccentric units that are arranged side by side or one after the other relative to the axis of rotation of the drive shaft. The drive shaft with the eccentric units provided on it therefore operates similar to a crankshaft, the crank radius of which however is steplessly adjustable, namely between a maximum crank radius and a minimum crank radius, which preferably can also assume the value of zero. In order to ensure that, the eccentricities of the guide regions and the eccentric components supported thereon are correspondingly synchronized relative to the axis of rotation of the drive shaft. The synchronization can thereby take place in such a way that with a corresponding rotation of the eccentric component relative to the associated guide region, the centerline or the axis of the eccentric component coincides with the axis of rotation of the drive shaft, whereby the previously-mentioned crank radius becomes zero and consequently no motion is transmitted to the driven shaft or the at least one freewheel apparatus.

An especially compact construction of the transmission can arise in that the drive shaft has an axial recess in which an adjusting shaft engages, by means of which the eccentric component is rotatable on the correspondingly associated eccentric region. The axial recess is thereby preferably arranged coaxially relative to the axis of rotation of the drive shaft. Through the telescoping of the individual components into one another, a space-saving design of the transmission can be achieved. It is especially suitable if the eccentric component has a recess for accommodating the guide region. The eccentric component can thereby be directly pivoted on the correspondingly associated guide region. It can nevertheless also be suitable to provide a support between the components, such as, for example, a slide bearing.

It can be especially advantageous for the construction of the transmission if an eccentric component forms an internal tooth system in the recessed area. That internal tooth system can thereby be developed in such a way that it makes possible a support of the eccentric component on the associated guide region over the gear tooth addendum circle bounded by the gear tooth system.

Furthermore, it can be especially suitable if the adjusting shaft has an external tooth system, whereby that external tooth system can engage with the internal tooth system of the eccentric component. Through such a constructional arrangement a rotation of the eccentric component on the guide region is made possible by rotation of the adjusting shaft.

An especially simple construction of the transmission can furthermore be ensured when the adjusting shaft is centered or supported in the recess of the drive shaft by the sections formed by the addendum circle of the external tooth system.

It can be especially advantageous if the connecting element, such as, for example, a connecting rod, is rotatably accommodated on the associated eccentric component by a roller bearing mounting. For many applications, a sleeve bearing can nevertheless be utilized, which is either self-lubricating and/or is lubricated by oil circulation.

An especially compact construction of the transmission can also be ensured in that at least two connecting elements are supported on a common eccentric component. The spacing of the drive shaft and the driven shaft that are arranged parallel to each other, the distance between the two swing axes of a connecting element and the freewheel units provided on the driven shaft can thereby be coordinated with one another in such a way that the connecting elements associated with a common eccentric component are aligned in the transmission in such a way that when transmitting torque, one connecting element is pulled and the other connecting element is pushed.

It can be especially advantageous if the at least one freewheel interacting with a connecting element and provided on the driven shaft has an outer ring, on which the connecting element is swingably linked. It is suitable if an individual freewheel is associated to each connecting element.

It can be especially advantageous if the distance between the driving and driven shafts that are arranged parallel to each other, the maximum adjustable eccentricity of an eccentric drive, and the freewheel associated with a connecting element are dimensioned and coordinated with each other in such a way that the maximum swing angle producible by the connecting element on the freewheel unit lies in the order of magnitude from 40° to 130°, preferably in the order of magnitude from 40° to 90°.

It can be especially advantageous if the eccentric component is rotatable by least 180° on the associated guide region. In an advantageous way, the distance between the axis of rotation of the drive shaft and the centerline or axis of the eccentrically arranged guide region can correspond to half the maximum adjustable eccentricity of the eccentric drive. The centerline or the axis of a guide region can also have an eccentricity relative to the axis of rotation of the drive shaft which corresponds to the eccentricity present between the centerline or axis of the guide region and the centerline or axis of the associated eccentric component. The effective radius of the eccentric drive can be set to zero by such dimensioning, whereby an infinite transmission ratio is present, which, in turn, means that no motion is transmitted to a connecting element. The maximum effective radius of the eccentric drive can be set through a corresponding rotation of 180° by an eccentric component on a guide region, which, in turn, corresponds to the smallest adjustable transmission ratio of the transmission, which nevertheless brings about the greatest possible movement of the at least one connecting element.

It can be advantageous for the construction of the drive arrangement if an eccentric component has two components, which are arranged about the associated guide region. Moreover, it is thereby suitable if first an eccentric component constructed in one piece is produced, which is then divided into two components. That division can advantageously take place by splitting, whereby with that process the eccentric component can already be heat-treated, therefore fully hardened, for example. That procedure has the advantage that an exact positioning of the assembled components is ensured due to the nonuniformity generated at the splitting points. The components constituting an eccentric component can be held together by at least a pressed-on or shrink-on assembly. That pressed-on or shrink-on assembly can be formed in an advantageous way by the bearing inner ring of at least one roller bearing pressed onto the eccentric component.

The rotation of the adjusting shaft relative to the drive shaft can take place simply through an adjusting motor provided in the region of an end of the drive shaft. That adjusting motor can advantageously be provided on the end of the drive shaft that faces away from the drive motor connected with the drive shaft. The adjusting motor can advantageously be arranged coaxially to the axis of rotation of the drive shaft. But other embodiments are also possible, in which the adjusting motor is arranged offset relative to the drive shaft.

The adjusting motor setting the eccentricity or the crank radius of an eccentric drive can advantageously have a driving connection with the drive shaft as well as with the adjusting shaft. It can thereby be suitable for the adjusting motor to rotate with the drive shaft. In order to make possible the desired adjustment, it can be suitable if a transmission ratio is present between at least one of the two shafts, namely the drive shaft and the adjusting shaft, and the adjusting motor. That transmission ratio can take place simply by means of a planetary transmission or a planetary gear set. The electric motor can be provided with current through slip rings, for example. It can be particularly suitable for setting the transmission ratio of the transmission if two planetary gear sets connected parallel to each other are assembled, which stand in operative connection with the shafts to be rotated to each other. In order to realize the desired adjustment, a so-called "harmonic drive" transmission can also be utilized.

Although the drive shaft that operates similar to the crankshaft can be constructed in one piece, it is also possible to construct that shaft as an assembled shaft. For example, a plurality of guide regions can therefore be screwed together.

Advantageously, the tooth system of the eccentric component and/or the tooth system of the adjusting shaft can be coated and/or surface-treated to improve their sliding properties. Those tooth systems can be constructed as helical or straight tooth systems. By the use of a helical tooth system the friction in the system can be increased, so that in an extreme case even a self-locking is made possible. With self-locking no or only a little energy is required to maintain the transmission ratio. The size or the portion of blocking action of the tooth systems engaging one another can consequently be determined by the corresponding selection of the tooth angle and consequently adapted to the respective application.

BRIEF DESCRIPTION OF THE DRAWINGS

Further suitable refinement features of a functional as well as constructional nature, which can be utilized in a drive arrangement in accordance with the invention, will be explained in greater detail on the basis of the following description of the figures. They show.

DESCRIPTION OF THE PREFERRED EMBODIMENTS

Figure 1:
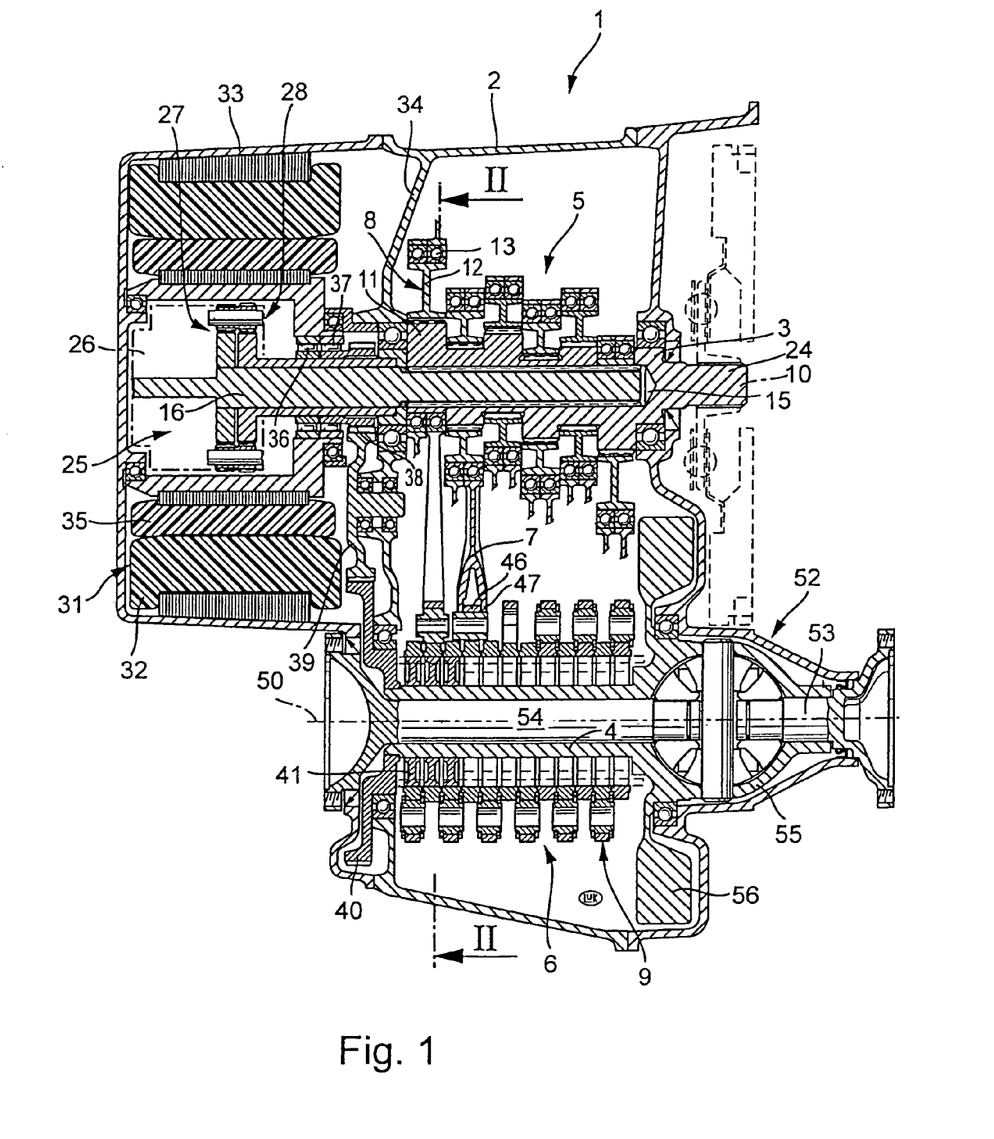
FIG. 1 a section through a drive arrangement constructed corresponding to the invention with a transmission and an electrical machine, FIG. 2 a partially shown section in accordance with line II—II of FIG. 1, FIG. 3 an enlarged scale of a detail shown in FIG. 2, FIG. 4 a constructional variant of an adjusting transmission for setting the transmission ratio, FIG. 5 an alternative arrangement of various components of a drive arrangement in accordance with the invention, FIG. 6 an enlarged representation of a freewheel unit 9, FIGS. 7 and 8 respective enlargements of a section of the freewheel unit illustrated in FIG. 6 and FIG. 9 a graph with different linear gradients.
Figure 2:
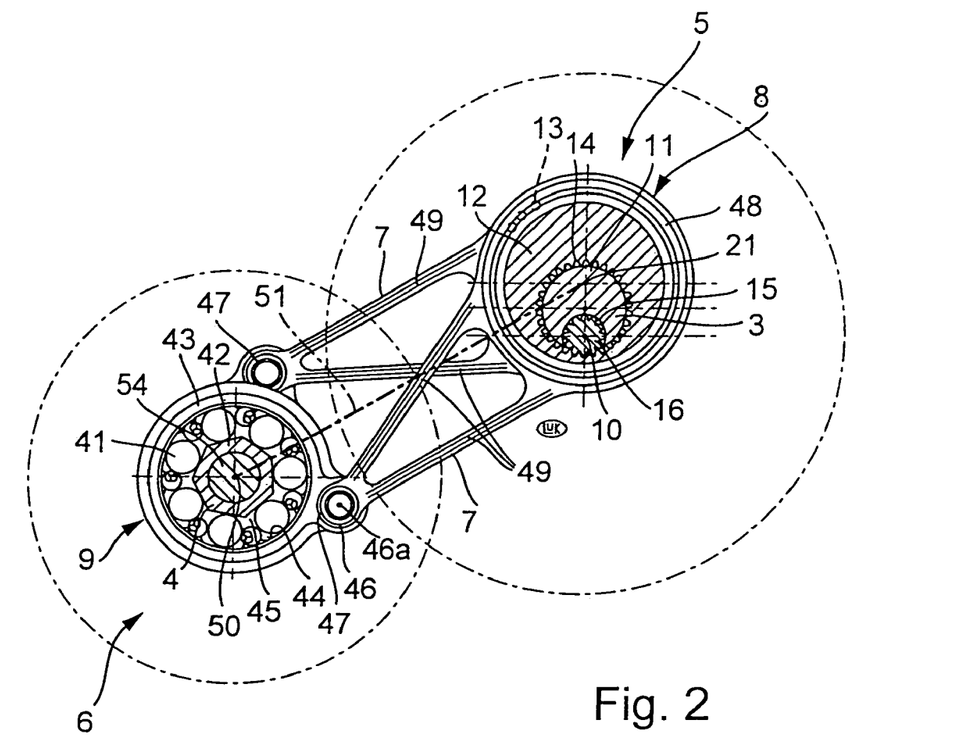
Figure 3:
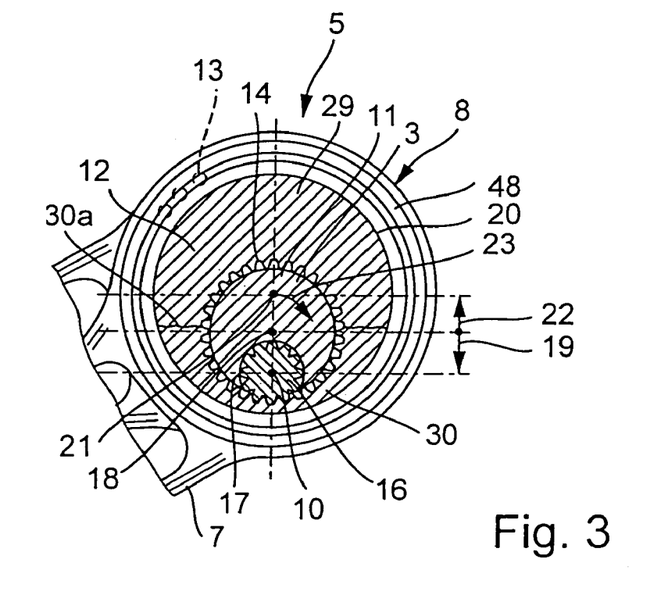

The drive arrangement illustrated in FIGS. 1 to 3 includes a transmission 1 that is constructed as a crank mechanism.

The transmission 1 has a housing 2, which can be connected with a drive motor, for example an internal combustion engine of a motor vehicle.

The transmission 1 of the drive arrangement furthermore has a driven shaft 3, which here forms the transmission input shaft, as well as a driven shaft 4, which here forms a transmission output shaft.

Both shafts 3 and 4 are rotatably supported in the transmission housing 2 and are oriented parallel to each other.

Both shafts 3 and 4 are drivingly connected with each other. That connection takes place by means of an eccentric drive 5 provided on the driven shaft 3 and a freewheel system 6 provided on the driven shaft 4, which are drivingly connected with each other at least through a connecting element 7, which is here constructed like a connecting rod.

In the illustrated embodiment, the eccentric drive 5 has a plurality of eccentric units 8 arranged axially side by side about the driven shaft 3.

The freewheel system 6 has a plurality of freewheel units 9 arranged axially one after the other about the driven shaft 4.

To form an eccentric unit 8, the driven shaft 3 carries or has a guide region 11 arranged eccentrically relative to the axis of rotation 10 of that driven shaft 3, on the surface area of which an eccentric component 12 is rotatably or swingably supported. At least one connecting element 7 is rotatably or swingably received on the eccentric component 12, which is here constructed as a connecting rod. The support of the at least one connecting rod 7 takes place in the illustrated embodiment through a roller bearing 13, which is here formed by a single-row ball bearing.

The eccentric components constructed ring-like or disk-like are, as can be especially derived from FIG. 1, constructed in such a way that they can accommodate two connecting rods 7 arranged axially alongside each other together with the corresponding support. The angular orientation of two such connecting rods 7 of the transmission, and articulation on the respective associated freewheel unit 9 is apparent from FIG. 2.

It can be derived particularly from FIG. 2 that an eccentric component 12 has a recess for receiving a guide region 11. The eccentric component 12 thereby has an inner tooth system 14 arranged about the recess. The inner tooth system 14 is thereby matched relative to the outer surface area of the corresponding eccentric guide region 11 in such a way that the eccentric component 12 is centered on the guide region 11 through the sections of the inner tooth system bounding the addendum circle of the inner tooth system 14.

The driven shaft 3 or the guide regions 11 formed by it have a recess 15 extending in the direction of the axis 10 which receives an adjusting shaft 16. The adjusting shaft 16 is supported in the recess 15 in the illustrated embodiment. As is apparent especially from FIG. 3, the adjusting shaft 16 has an outer tooth system 17 whose teeth engage the teeth of the inner tooth system 14 of the eccentric component 12. The adjusting shaft is centered or supported in the recess 15 of the driven shaft 3 through the sections of the outer tooth system 17 forming the addendum circle of the outer tooth system 17.

As is also apparent from FIG. 3, the guide regions 11 belonging to the driven shaft 3 that are arranged eccentrically relative to the axis of rotation 10 of that shaft 3 are constructed in such a way that the recess 15 is open over a certain angular region so that in that region the tooth system 17 of the adjusting shaft 16 can extend radially relative to the outer surface of the guide region 11, whereby engagement with the tooth system 14 is made possible.

When a number of "n" guide regions 11 are present, they are preferably distributed about the adjusting shaft 16, or about the axis of rotation 10, in such a way that the angular offset in the peripheral direction between two successive guide regions 11 amounts to 360°/n. Six guide regions 11 are apparent from FIG. 1, for example, so that the previously-mentioned angle of 360°/n therefore amounts to 60°. The guide regions 11 respectively succeeding one another about the shaft 3 need not thereby immediately follow in the axial direction of the adjusting shaft 16 or the driven shaft 3, but the axial sequence of the individual guide regions 11 can be selected corresponding to requirements concerning stability, dynamics, and other parameters.

As can be derived from FIGS. 1 to 3, the two shafts 3 and 16 are coaxially arranged relative to the axis of rotation 10 of the driven shaft 3. Therefore that means that the driven shaft 3 and the adjusting shaft 16 can rotate about the same axis of rotation 10.

It can be derived from FIG. 3 that the guide regions 11 formed disk-like have a centerline 18 relative to their annular or cylindrical outer surface, which is arranged eccentrically by the distance 19 relative to the axis of rotation 10.

Furthermore, it can be deduced from FIG. 3 that the eccentric components 12 have a centerline 21 relative to their outer annular surface 20, which is arranged eccentrically relative to the centerline 18 of the guide regions 11 at a distance 22. The individual components 16, 3 and 12 are thereby coordinated with one another in such a way that the distance 19 corresponds to the distance 22, so that therefore the eccentricity of the centerline 21 is twice as large relative to the axis of rotation 10 as the eccentricity of centerline 18 relative to that axis of rotation 10.

The relative position between the individual components or component regions 16, 11, and 12 illustrated in FIG. 3 therefore produces the maximum stroke that an eccentric unit 8 can transmit to the connecting rods 7 supported thereon. That stroke corresponds to double the sum of the distances 19 and 22.

By rotating the shaft 16 relative to shaft 3, the eccentric component 12 of an eccentric unit 8 rotates or swings about the corresponding guide region 11 through the interengaging tooth systems 14, 17. The rotation or swing axis thereby corresponds to centerline 18. By that rotation of shaft 16 the centerline 21 moves along a circle with the center 18 and a radius corresponding to the distance 22 or 19. That circular movement of the centerline 21 is indicated in FIG. 3 by arrow 23.

It is apparent from FIG. 3 that on the basis of a displacement corresponding to arrow 23 of the centerline 21 about the center point or centerline 18 a reduction of the distance between the centerline 21 and the axis of rotation 10 takes place. That means that the eccentricity of the eccentric components 12 relative to the axis of rotation 10 is reduced, and consequently the stroke transmittable to the connecting elements or connecting rods 7 is also reduced.

On the basis of the coordination here present between the two distances 19 and 22, the centerline 21 can be brought coaxial to the axis of rotation 10 through a rotation of the centerline 21 about the centerline 18 corresponding to an angle of 180°. That means that the annular outer surface 20 of an eccentric component 12 has the axis of rotation 10 of shaft 3 as the center or median axis, so that then no more eccentricity is present. Consequently, also no stroke movement can be transmitted to the connecting element 7. That therefore means that, although shaft 3 is being driven, the driven shaft 4 or the output shaft of the transmission 1 can be stationary.

The input shaft 3 of the transmission 1 constructed crankshaft-like has an end pin 24 for connection with a drive engine. That end pin 24 is externally geared in FIG. 1 and receives the hub of a torsional vibration damper, which is drivingly connected with a flywheel of a not further illustrated internal combustion engine. An adjusting mechanism 25 is provided on the side of the transmission input shaft 3 facing away from the end pin 24 or the engine, which here is only schematically indicated. The adjusting shaft 16 can be rotated relative to the transmission input shaft 3 through the adjusting mechanism 25, whereby the gear ratio condition of the transmission 1 is changed. As illustrated in FIG. 1, the adjusting mechanism can be provided concentrically relative to the axis of rotation 10 and be rotatable about that axis 10. The adjusting mechanism 25 can have an electric motor 26, for example, which is merely illustrated schematically. The construction of the adjusting mechanism is thereby undertaken in such a way that the rotor is drivingly connected with one of the two shafts 3, 16, and the stator is in driving connection with the other of the two shafts 16, 3. Those connections can take place, for example, by means of gears, which can form planetary drives. In FIG. 1, the previously-mentioned driving connections are realized with shafts 3, 16 by means of two planetary sets 27, 28 connected in parallel. With the illustrated embodiment, the planetary sets 27, 28 are constructed and arranged in such a way that a sun gear is rotatably connected with shaft 3, and the other sun gear with shaft 16.

The adjusting mechanism 25 can nevertheless also have a so-called "harmonic drive" transmission.

In the illustrated exemplary embodiment in accordance with FIG. 1, the transmission input shaft 3 constructed crankshaft-like is formed in one piece. A shaft 3 of that type could nevertheless also be composed of several components arranged axially one behind the other, which are rigidly connected with one another. Therefore, for example, several guide regions 11 produced as individual components can be connected with one another, which can, for example, take place through screwed connections. In addition to those screwed connections, positive-locking connections that can be formed by interengaging profiles can be provided. A welded construction would likewise be possible.

When utilizing a one-piece transmission input shaft 3, the eccentric components 12 must be divided into at least two structural elements 29, 30 (FIG. 3) so that they can be mounted about the guide regions 11. That can take place, for example, in that the individual eccentric components 12 are first produced in one piece and preferably also heat-treated, and are only afterward divided into two components, for example by splitting. The fracture sites 30a generated by the splitting are apparent in FIG. 3. Although threaded and/or pinned connections can be provided for holding two components 29, 30 together, in many applications it may suffice if the components 29, 30 associated with each other are held together by at least one roller bearing received on the outer surface 20. For that purpose, for example in the illustrated embodiment, the inner rings of the two one-row ball bearings 13 associated with an eccentric component 12 can be pressed on and/or shrink fitted to the eccentric component 12 composed of two structural elements 29, 30. Exact positioning of two structural elements 29, 30 can also be ensured on the basis of the roughness present in the region of the fracture sites 30a.

The interengaged tooth systems 14, 17 can be constructed as straight teeth or, however, also as helical teeth. By utilizing helical teeth, the friction in the system or between the intermeshing tooth systems can be increased. The friction present in the entire system is thereby dependent upon the angle of the helical teeth. The helical teeth can thereby be constructed in such a way that in the entire system of the eccentric drive 5 self-locking practically occurs, so that then practically no energy is necessary in order to maintain the transmission set ratio. With a design of that type, nevertheless more power or energy is then necessary for adjusting the system or the eccentric drive 5. The use of helical teeth therefore makes possible a design of the degree of locking in the eccentric drive 5 that is adapted to the respective application.

In order to at least reduce dynamic forces within the transmission 1, it can be suitable if compensating masses would be provided at each end of the crankshaft-like transmission input shaft 3, through which the possibly existing free torques or free forces can be balanced. Those additional masses can be similarly constructed and arranged about the axis of rotation 10 of the shaft 3 like the eccentric components 12. The additional masses can therefore, similar to the eccentric components 12, change their effective radius, therefore their eccentricity relative to the axis 10. In that way, it is possible for all masses at least on shaft 3 to be balanced, at least when setting a crank radius or an eccentricity of zero. A crank radius of zero means that the centerline or the center axis 21 is situated in a position that is coaxial to the axis of rotation 10.

An electrical machine 31, which can be designed as a generator and/or a motor, is provided in connection with the embodiment of a drive arrangement illustrated in the figures, as is especially apparent from FIG. 1. To the extent that the electrical machine 31 is also operable as a motor, it can serve as a starter for the internal combustion engine that is coupled to the shaft pin 24. Furthermore, that electrical machine 31 can serve as an auxiliary drive for the motor vehicle outfitted with such a transmission. For that purpose, corresponding freewheels or couplings are provided that, if need be, also enable decoupling of the electrical machine 31 from the internal combustion engine from time to time so that, if need be, the internal combustion engine can also be shut down during travel of the motor vehicle. The electrical machine 31 can enable hybrid operation of the motor vehicle.

As is apparent from FIG. 1, in the depicted embodiment the electrical machine 31 is arranged coaxially to the axis of rotation 10 of the transmission input shaft 3, whereby the stator 32 is accommodated by a housing part 33 that is rigidly connected with the transmission housing 2 or can form a constituent of that transmission housing 2. The mechanical transmission including the eccentric drive 5 is separated from the electrical machine 31 by a partition 34. The rotor 35 of the electrical machine 31 is here rotatably supported in the housing 2 or in the housing part 33 and selectively connectable with the transmission input shaft 3 and/or with a gear 38 rotatable relative to shaft 3 through couplings, which here are constructed as freewheels 36, 37. The gear 38 is drivingly connected with the transmission output shaft or the shaft 4 to be driven, which takes place through two gears 39, 40 in the illustrated embodiment. The gear 40 is thereby arranged concentrically to shaft 4 and the gear 39 serves as a connecting element between the two gears 38, 40.

The transmission ratio included in gears 38, 39 and 40, which ensures a driving connection between the rotor 35 of the electrical machine 31 and the shaft 4, is preferably constructed in such a way that during generator operation of the electrical machine the rotor 35 rotates with a rotational speed which is at least equally high or is higher than the rotational speed of the engine with which the shaft 3 is driven. To the extent that the rotor 35 rotates at a higher rotational speed than the engine driving the shaft 3, the drive of the rotor 35 can take place proceeding from the shaft 3 through the connecting element 7 on the shaft 4 and from there through the transmission ratio included in gears 38, 39, 40 to the rotor 35. With a drive of the electrical machine 31 in that way, the coupling means, which are here formed by freewheels 36, 37, are connected in such a way that no direct drive between the shaft 3 and the rotor 35 is present. In that way, blockage of the entire drive system can be avoided.

The driving connection between the rotor 35 and the shaft 4 can also take place by means of a chain or belt drive. Furthermore, it can be suitable if the driving connection between rotor 35 and shaft 4 permits a variable transmission ratio, whereby that variation can take place stepwise or continuously. With a continuously possible variation of the transmission ratio condition of the driving connection between the rotor 35 and the shaft 4, so-called belt-driven, conical pulley transmissions can be installed in an advantageous manner. Transmissions of that type can be selectively regulated or controlled as a function of operating parameters of the internal combustion engine or the drive arrangement. That can take place, for example, through hydraulic and/or electrical means. Nevertheless, it is also possible to install belt-driven, conical pulley transmissions that undergo a variation in transmission ratio through centrifugal-force-dependent means.

The coupling means 36, 37, which on one hand ensure a driving connection of the rotor 35 with the shaft 3, therefore practically directly with the drive engine, and on the other hand with the output side of the transmission, in the present embodiment with the shaft 4, are preferably constructed in such a way that, at least when operating the electrical machine 31 as a generator, the rotor 35 is driven by the faster drive. In that way it can be ensured that especially with a fixed transmission ratio between the output side of the transmission, namely here between the shaft 4 and the rotor 35, when the shaft 4 is rotating slowly or even standing still, the rotor 35 can be driven directly from the drive engine—by connection of the shaft 3—therefore by the internal combustion engine of the motor vehicle.

To the extent that the electrical machine 31 is operated as a motor, it can also serve for starting the engine that drives the shaft 3. With such a mode of operation of the electrical machine 31, the driving connection to the output side of the transmission, therefore to the shaft 4, is preferably interrupted. That can take place, for example, by means of a switchable coupling unit 37.

In the illustrated embodiment in accordance with FIG. 1, a transmission-ratio-free drive of the rotor 35 is possible by means of the shaft 3 driven by the internal combustion engine. It can also be suitable, however, to provide a transmission unit between the rotor 35 and the internal combustion engine, which enables a change in the rotational-speed-related transmission ratio condition between the internal combustion engine and the rotor 35. That can take place through a shiftable gear drive having at least two stages or, however, by means of variable transmissions. A transmission unit or such a transmission of that type can be provided, for example, between the rotor 35 and the shaft 3.

The adjustment mechanism 25 for the eccentric drive 5 is arranged in a particularly space-saving manner within the at least partially hollow formed rotor 35.

The electrical machine 31 can advantageously have an output in the order of magnitude between 2 and 15 kW, whereby it is suitable for many applications if the output of the electrical machine 31 amounts to at least 5 kW. With a sufficiently large output-wise proportioning of the electrical machine 31, it can at least also serve as drive assistance for a motor vehicle. Furthermore, the electrical machine 31 can then also be relied upon as a brake for the motor vehicle. In that way, it becomes possible to ensure a braking action through the electrical machine 31 when descending a mountain or also during deceleration of the motor vehicle, which cannot be realized by the transmission 1 on the basis of its constructional configuration. When utilizing the electrical machine 31 as a retarding member, therefore as a brake, it is driven through the drive connection including gears 38, 39, 40. In operating conditions in which the electrical machine 31 serves as a retarding unit for the motor vehicle, the rotor 35 can be coupled directly or through the shaft 3 with the internal combustion engine, so that the internal combustion engine can also produce a braking torque. With an operating mode of that type, the braking actions of the electrical machine 31 and the engine or the internal combustion engine are added. The resulting braking torque is thereby directed through the driving connection between rotor 35 and shaft 4 including the gears 38, 39, 50.

To the extent the engine driving the shaft 3 and the electrical machine 31 simultaneously ensure a drive of the motor vehicle, the power output provided by the electrical machine 31 can be transmitted to the shaft 4 through gears 38, 39, 40, and the power output from the engine is transmitted to shaft 4 by means of the eccentric drive 5 and the freewheel apparatus 6.

The drive arrangement in accordance with the invention therefore enables a plurality of possible connections for the drive or the retardation of a motor vehicle by means of the electrical machine 31 and/or the internal combustion engine of the motor vehicle, whereby the connection possibilities described relative to driving can also be only partially provided.

Advantageously, the transmission ratio unit that operates parallel to the transmission 5, which, for example, can be formed by gears 38, 39, 40, can have a transmission ratio condition from 2 to 6, whereby it can be especially suitable for many applications if that transmission ratio condition amounts to about 4. With a transmission ratio condition of 4, the rotor of the electrical machine 35 can therefore have four times the rotational speed of shaft 3.

As can be concluded from FIG. 2, the shaft to be driven or the transmission output shaft 4, which is rotatably supported in the housing 2, has a polygonal profile radially outwardly, which is here formed as a hexagon.

The individual freewheel units 9 have clamping bodies 41, which are here formed by rollers. The rollers are arranged between an inner ring 42, here formed by a region of the shaft 4, and an outer ring 43, whereby the surfaces 44, 45 of the outer and inner rings 43, 42 are coordinated with each other in such a way that the clamping bodies 41 can block that rotation at least in one relative rotation direction between inner ring 42 and outer ring 43, so that then both rings 42, 43 are rotated collectively. No blocking action is produced by the clamping bodies 41 in the other relative rotation direction between the two rings 42, 43. The individual clamping bodies or rollers 41 are acted upon preferably in the blocking direction, which can take place through at least one spring element. Furthermore the clamping bodies 41 are preferably positioned to each other in the peripheral directions by at least one retainer.

It can be especially advantageous if the freewheel system 6 or the individual freewheel units 9 can be switched, therefore the blocking direction of the clamping bodies 41 can be switched relative to both rotatable rings 42, 43. By the use of freewheel units of that type, the direction of rotation of the shaft 4 can be changed in a simple manner in transmission 1, and consequently a reverse gear, for example, can be realized.

As can be concluded in particular from FIG. 2, the outer ring 43 of a freewheel unit 9 has a link region 46, which here is formed by a projecting cam of the outer ring 43. The end 47 of a connecting rod 7 is swingably or rotatably supported relative to the link region 46 about the axis 46a. As can furthermore be concluded from FIG. 2, the two connecting rods associated with an eccentric component 12 are arranged in such a way that the arms 49 extending between the bearing outer rings 48 and the ends 47 are arranged symmetrically relative to a straight line 51, which runs through the axis of rotation 50 of the shaft 4 and the momentary position of the centerline 21 of the eccentric component 12. The bearings or ends 47 of two connecting rods 7 associated with each other likewise continuously have a symmetrical arrangement relative to straight line 51.

It can be advantageous if the synchronization of the individual components takes place in such a way that the two link regions 46 or the axes 46a of the connecting rods 7 associated with each other are at least approximately diametrically opposed relative to the axis of rotation 50 in those rotational positions of an eccentric unit 8 in which the centerline 21 of the eccentric component 12 has the smallest spacing relative to the axis of rotation 50. The angle existing in that position of the centerline 21 relative to the axis of rotation 50, and relating to that axis of rotation 50 between the two link regions 46 or the two axes 46a, can nevertheless be smaller than 180°, whereby if need be it can be advantageous for many applications if that angle is greater than 180°.

As can additionally be concluded from FIG. 1, the shaft 4 forms the input or drive shaft for a differential 52 that can be arranged laterally or beneath the engine connected with the shaft 3. The two output shafts 53, 54 are arranged coaxially to the shaft 4, whereby the shaft 54 is received, and if need be supported, inside the shaft 4 formed as a hollow shaft.

In the illustrated embodiment, the shaft 4 and the differential cage 55 are illustrated in one piece for simplification of FIG. 1. Nevertheless, in practice several parts connected with one another are provided.

Furthermore an inertial mass 56 connected with the shaft 4 is provided, through which the torsional vibration behavior of the transmission 2 can be influenced.

It can be particularly advantageous for the functioning of the transmission 2 if the number of eccentric units 8 is even. Six eccentric units 8 and twelve connecting rods 7 are present in the illustrated embodiment.

As can be deduced from FIG. 1, for weight reduction purposes the eccentric components 12 are at least in partially formed as hollow bodies, whereby an I-shaped cross-section results for the eccentric components 12 illustrated.

Through the constructional configuration of the eccentric drive 5 and the freewheel system 6 of the invention, the conception of a transmission which has small rotational irregularities with simultaneously high excitation frequency is made possible. In that way, the possibility of dimensioning the inertial mass or centrifugal mass 56 connected with the output shaft 4 comparatively small or slight is produced. The previously-mentioned advantages are attained by distributing the output to be transmitted to a large number of comparatively lightly formed eccentric units 8 or freewheel units 9.

Because of the construction of the transmission 1, the latter produces a non-uniform rotational motion similar to an internal combustion engine, which is attributable to the kinematics of the transmission. The non-uniform rotational motion arises through the superposition of sine-like crank speeds, which are generated by the eccentric units 8 arranged axially alongside one another, which act similar to a crank. The non-uniformity of rotational motion mentioned is thereby a function of the number of eccentric units 8. The more such eccentric units 8 that are provided and preferably arranged evenly relative to one another and offset relative to the axis of rotation, the more constant the rotational motion becomes.

In order to ensure the use of drive arrangements or transmissions in accordance with the invention, the oscillations that are generated by unsteady rotational motions must be reduced to an acceptable extent. That is necessary to avoid torque fluctuations in the drive train of the motor vehicle that impair riding comfort or to reduce them at least to a tolerable extent. A particularly effective measure in that regard resides in coupling an inertial mass or a flywheel 56 with the output shaft 4 of the transmission 1. The connection between the inertial mass 56 and the output of the transmission 1, which is here formed by the shaft 4, can thereby take place directly. The inertial mass 56 and the shaft 4 can also be rigidly connected with each other, as can be deduced from FIG. 1. For the sake of simplicity, the inertial mass 56 and the shaft 4 are illustrated in one piece in FIG. 1. Of course, however, the inertial mass 56 can be formed by at least one separate component, which is connected with shaft 4 in a known way, for example by welding, riveting, screwing or wedging.

The inertial mass 56 can also be formed as a damper or a pendulum. For example, the inertial mass 56 can have pendulum masses for that purpose. The inertial mass 56 can also have mass components that are connected with an inertial component of the inertial mass 56 through springs and/or friction devices.

It can also be advantageous if the inertial mass 56 has a torsional vibration damper, which is functionally active between the shaft 4 and the differential 52 or the output shafts 53, 54. In an advantageous way, the inertial mass 56 can also be formed as a so-called two-mass flywheel, whereby the one mass can be functionally rigidly connected with the shaft 4 and the other mass can be functionally rigidly connected with the differential 52 or the output shafts 53, 54.

It is especially suitable if the inertial mass 56 is formed or dimensioned in such a way that in normal driving operation of the motor vehicle the natural frequency of the "resulting spring," which arises on the basis of flexibilities in the region of the freewheel units 9, the connecting rods 7, and the other components situated in the torque transmission train, is smaller than the excitation frequency of the transmission 1. In the case of the previously-mentioned natural frequency of the "resulting spring," the effect of the inertial mass 56 should be taken into consideration.

To the extent that the previously-mentioned "resulting spring" has a soft characteristic and the inertial mass 56 is dimensioned sufficiently large, the irregularities of the engine can also be damped, at least at high transmission ratios of the transmission 1. The damper between the engine and transmission can then basically only serve for a central offset compensation between the engine output shaft and the transmission input shaft. The previously-mentioned high transmission ratios are necessary when starting a motor vehicle. The transmission ratio addressed here moreover relates to the ratio between the rotational speed on the output shaft of the engine to the rotational speed of the wheel drive shafts 53, 54 or the wheels themselves. The previously-mentioned high transmission ratios lie in the order of magnitude of from 12:1 to 15:1 in ordinary motor vehicles.

It can be suitable if in addition to the inertial mass 56 a so-called two mass flywheel is provided between the internal combustion engine 270 and transmission 1, 201 (see FIG. 5), that thereby through its presence makes possible control of the irregularities of the internal combustion engine at small transmission ratios. Transmission ratios in the order of magnitude from 4:1 to 2:1 are to be understood as small transmission ratios, whereby here, in turn, the ratio between rotational speed of the engine output shaft and the rotational speed at the wheels is also to be understood. Usually that transmission ratio condition lies in the order of magnitude of from 2.8 to 3.5. Such a two-mass flywheel does not need to be formed as an idle damper, which means therefore that the damping unit of the two-mass flywheel only needs to be adjusted to the load range of the motor vehicle.

In order to obtain a high, effective-mass inertial moment even when utilizing a comparatively low mass, it can be suitable if that mass is rotatably supported in such a way that it can be driven through a drive with an increasing speed transmission ratio. The shaft driving such a drive can thereby be the transmission input shaft 3 or the transmission output shaft 4, for example.

For damping the output side oscillations, a friction unit or a damping unit can also be arranged directly on the drive shaft associated with the one drive wheel, that becomes operative by rotation of with the drive shaft, for example.

Mass balancing shafts can also be provided on or in the transmission for the reduction or elimination of mass forces of the transmission side crank drive. Such mass balancing shafts are also utilized in connection with internal combustion engines.

A fixed angular relationship can also be present between the internal combustion engine and the eccentric drive 5, through which the irregularities can be at least partially compensated. That angular relationship is thereby preferably selected in such a way that the output requirement existing on the eccentric drive for driving the motor vehicle is always greatest when the rotational motion of the crankshaft is accelerated due to ignition processes, and vice versa. The output requirement existing on the eccentric drive 5 or measurable output requirement is a function of the engagement condition of the individual freewheel units 9 of the freewheel system 6. A correspondingly high torque should also be available on the crankshaft of the internal combustion engine, preferably in the conditions in which several freewheel units 9 engage, and thereby a higher output measure is possible on the eccentric unit 5 on the crankshaft of the internal combustion engine and also a correspondingly high torque is available. In operating conditions in which nevertheless only few freewheel units 9 engage, and consequently only a low output can be measured on the eccentric drive 5, it is suitable if the torque generated on the crankshaft of the internal combustion engine by ignition processes is comparatively small. In relation to the extreme case in which the internal combustion engine has only one piston and the transmission has only one eccentric unit 8, that means that the freewheel unit 9 associated with the corresponding eccentric unit 8 is blocked during a combustion process, therefore transmits torque, whereas the corresponding freewheel unit 9 operates as a freewheel during a compression process.

In addition, the transmission 1 can be constructed very compactly since the shaft 3 to be driven can be coaxially arranged with the crankshaft of an internal combustion engine to be connected with the end pin 24. The shaft 3 can thereby rotate at the same rotational speed as the crankshaft of the internal combustion engine. Furthermore, the output shaft 4 of the transmission 1 is practically directly connected with the differential 52, and therewith is arranged very close to the shafts 53, 54 driving the wheels. Such a construction is especially advantageous for motor vehicles with a transversely mounted engine and front drive.

Figure 4:
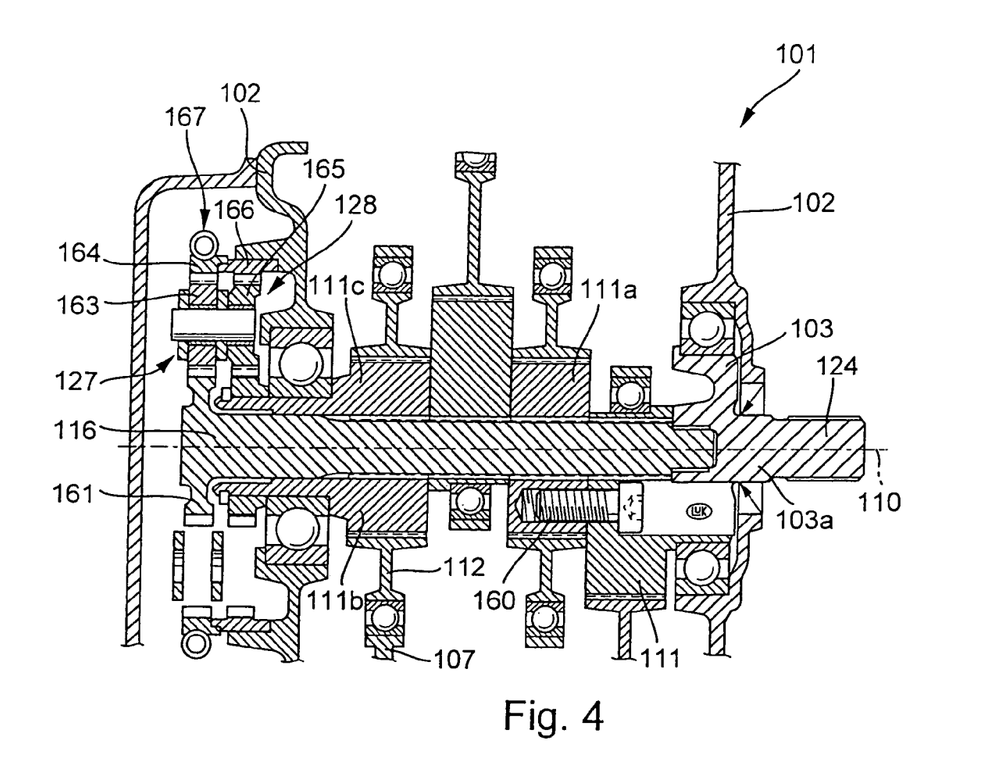

In the transmission 101 partially illustrated in FIG. 4, the driven shaft 103 is assembled from several component parts. Those component parts include an engine-side drive part 103a, which forms the end pin 124 as well as also an eccentric guide region 111. The drive part 103a is rotatably supported in the housing 102, as is apparent in FIG. 4. The component parts forming the shaft 103 furthermore include a plurality of disk-like formed guide regions 111a as well as an end part 111b, which is likewise rotatably supported in the housing 102 and forms an eccentrically formed guide region 111c relative to the axis of rotation 110 of the shaft 103. The individual components 103a, 111a, and 111b are arranged axially one after the other and are connected with one another, for example through bolted connections 160.

With the exemplary embodiment illustrated in FIG. 4, the eccentric components 112 respectively receive only one connecting element 107.

Two planetary sets 127, 128 connected parallel to each other are provided for rotating the adjusting shaft 116 relative to the input shaft 103. The planetary set 127 has a sun gear 161 that is non-rotatably connected with the shaft 116. The planetary set 128 has a sun gear 162 that is non-rotatably connected with the shaft 103. The planet gears 163 of the planetary set 127 engage a ring gear 164 that is rotatably supported or received in the housing 102. The planet gears 165 of the planetary set 128 operate together with a ring gear 166, which is non-rotatable relative to the housing 102.

The ring gear 164 is rotatable through a worm gear drive or a worm gear 167. The ring gear 164 has a corresponding tooth system therefor. With a configuration of that type, the motor provided for adjusting the transmission gear ratio, such as in particular an electric motor, can be arranged offset relative to the axis of rotation 110. With the illustrated embodiment, the worm gear 167 is constructed in such a way that the electric motor driving the worm gear 167 is arranged obliquely relative to the shaft 103. In the illustrated exemplary embodiment, the planet gears 163 and 165 have an identical tooth system diameter, but it can also be suitable if the planet gears 163 have a tooth system that has another diameter than the tooth system of the planet gears 165.

The connecting rods 7, 49 can also be dimensioned in such a way that they are practically rigid at least in the longitudinal direction, that is, in the direction of a line which connects the two centerlines or axes 46a and 21, and therefore have practically no elasticity and thereby experience no or an insignificant deformation during a force transmission or a torque transmission.

However, it can also be especially advantageous if the connecting elements or connecting rods 7 are connected in such a way that they experience a certain elastic deformation as a function of the forces or torques transmitted. The deformation increases when the force becomes greater or with increasing torque.

An elastic design of the connecting elements 7, 49 of that type has the advantage that certain manufacturing tolerances can be compensated in that way. Furthermore, such an elasticity has the advantage that that way it can thereby be ensured that a plurality of freewheel units 9 are in a blocked condition, whereby it will be attained that in each case the torque to be transmitted can be transmitted by a plurality of connecting elements 7, 49 to the shaft 4. During the transmission of torque, the connecting elements 7, 49 are therefore in an elastically tensioned condition. On the basis of the elasticity of the connecting elements 7, 49 and the possibly occurring timewise offset of a plurality of freewheel units 9, the forces or torques transmitted by the individual connecting elements 7 can vary from one another.

On the basis of the previously-mentioned possible elastic tension condition of the connecting elements 7, 49, the freewheel units 9 can still be in a stressed or blocked condition, although the connecting element associated with such a freewheel unit 9 is already moving in the unblocking direction of the corresponding freewheel unit 9. That therefore means that at least theoretically a freewheel unit 9 only discontinues its blocking function when the corresponding connecting element is in a relaxed position.

The previously-mentioned operating mode can, if need be, also be ensured by the introduction of a corresponding elasticity at another position. An elasticity of that type can take place, for example, in the region of the connecting rod bearing sites, for example, 46 (see FIG. 1). An elasticity of that type could, if need be, also be provided in addition to the elasticity of the connecting elements 7. An elasticity of that type could be realized, for example, by arrangement in the region of the pivot bearing at site 46 of a rubber or plastic ring, which receives the actual bearing, for example.

It can be particularly advantageous for the function of the transmission if the distance between the two pivot or rotation axes 21, 46a (see FIG. 2) of a connecting element 7 is smaller than the distance between the two axes of rotation 10, 50 of the driven shaft 3 and the driven shaft 4.

Furthermore, it can be especially advantageous for the design of the drive arrangement if the axis of rotation 46a of the connecting rod has a spacing relative to the axis of rotation 50 of the output shaft 4 that corresponds to about double the spacing between the axis of rotation 10 of the input shaft 3 and the centerline 21 of an eccentric component 12 at the maximum set eccentricity. That maximum eccentricity is evident in FIGS. 2 and 3.

As was explained in greater detail particularly in connection with an embodiment in accordance with FIGS. 1 to 3, the freewheels of freewheel units 9 are provided on the output shaft 4 of the transmission 1 on which the drive torque to be transmitted is transmitted by means of the connecting elements or connecting rods 7. With the exemplary embodiment illustrated in FIG. 1, the support of the shaft 4 takes place at both shaft ends. The torque is further conducted through the polygon-like-arranged surfaces 45 of the shaft 4 directly on the differential cage 55. By subdividing the connecting elements or connecting rods 7 into pulling and pushing connecting rods 7, the transverse forces which act upon shaft 4 are at least partially canceled based upon the simultaneous engagement of several freewheels, whereby the forces acting upon the supports of the shaft 4 can at least be reduced.

In order to ensure reverse travel possibility in a motor vehicle which is outfitted with a transmission operating according to the principle described, a corresponding reverse gear step must be provided between the motor vehicle drive engine and drive shafts 53, 54 for the wheels. For example, a corresponding gear step can be provided for that purpose between the shaft 4 and the drive wheels. Furthermore, a corresponding gear step can be provided between the drive engine of the motor vehicle or the shaft 3 and the output shaft 4, whereby then the blocking action of the freewheel units 9 must be discontinued, at least for those operating phases during which reverse travel of the motor vehicle is desired.

As already described, it is also possible to realize a reverse gear function in an especially simple way by means of the freewheel 6, that is, by equipping the freewheel units 9 with a reversible blocking direction. A possible construction for configuring a freewheel of that type is illustrated in FIGS. 6 to 8.

Figure 6:
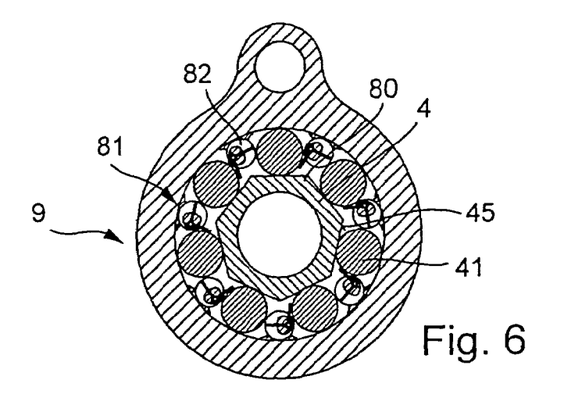
Figure 7:
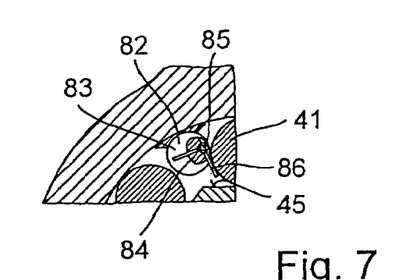
Figure 8:
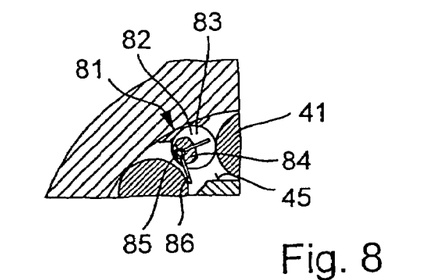

The freewheel unit 9 partially illustrated in FIGS. 6 to 8 has already been described with respect to its construction principle in connection with FIG. 2. The polygonal profile 80 present on the outer periphery of shaft 4 is constructed in such a way that surfaces 45 forming that profile 80 are symmetrically constructed with respect to the blocking function or freewheel function of the freewheel 9, which is realized utilizing the clamping bodies 41.

A switching device 81 is provided for switching the blocking function of the freewheel 9, which has several switching units 82 that are respectively arranged between adjacent clamping bodies 41. The switching units 82 are synchronously actuated and have switching means, which each have a rotatable, disk-like region 83 as well as a profiled region 84, preferably composed of a profiled bar. A spring is provided in the profiled region 84, which is formed by a leg spring 85 in the illustrated embodiment. The spring 85 is braceable between the profiled region 84 and a clamping body 41. For that reason, the leg spring 85 has a leg 86 that can act against a clamping body 41 in the corresponding blocking direction. The spring element 85 and the profiled regions 84 are arranged eccentrically relative to the axis of rotation of the disk-like regions 83, so that when the disk-like regions 83 rotate, a peripheral displacement of the spring element 85 and the profiled regions 84 takes place. The two peripheral extreme positions of the spring element 85 and the profiled regions 84 are illustrated in FIGS. 7 and 8. The disk-like regions 83 are supported in a carrier or housing portion, which is preferably non-rotatable relative to the shaft 4. It can be deduced from FIGS. 7 and 8 that the direction of tensioning or the force direction of the spring element 85 or the spring leg has changed relative to the clamping body 41 by rotation of the disk-like regions 83 by about 180°. The position illustrated in FIG. 7 of the individual components relative to each other can, for example, correspond to the pulling operation of a motor vehicle, so that the relative positions of the individual components which are set for reverse travel of the motor vehicle is then illustrated in FIG. 8. In an advantageous way, the contoured profiled regions 84, as already mentioned, can be formed bar-like, whereby those profiled bars 84 can extend axially through all freewheel units 9, in accordance with FIG. 1, so that by rotation of the profiled rods 84 all freewheel units can be switched at the same time.

Figure 5:
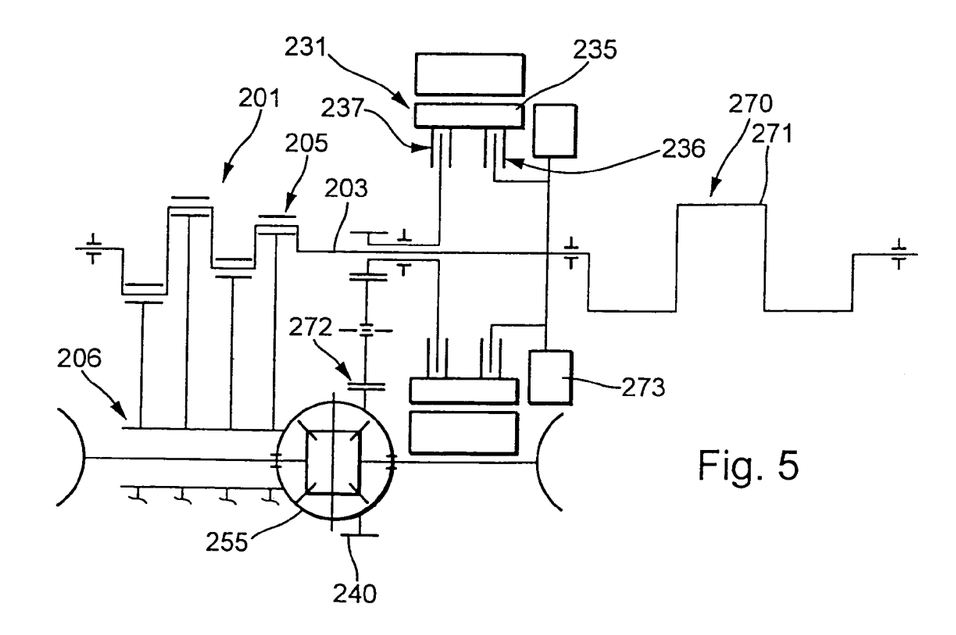

The drive arrangement schematically illustrated in FIG. 5 differs from that illustrated in FIG. 1 in that the electrical machine 231 is axially arranged between the transmission 201 and the internal combustion engine 270, of which merely the crankshaft is schematically shown.

The transmission 201 is constructed similar to the transmission 1 in accordance with FIG. 1, and consequently likewise has an eccentric drive 205 as well as at least one freewheel system 206, which nevertheless are merely schematically shown. The rotor 235 of the electrical machine 231 is on one hand connected with the transmission input shaft 203 and the crankshaft 271 of the internal combustion engine 270 through a friction clutch 236, and on the other hand can be coupled with the output side of the transmission through a friction clutch 237. Between the rotor 235 or the friction clutch 237 and the output side of the transmission a transmission ratio unit 272 is provided, which is constructed similar to those which were described in connection with FIG. 1. The transmission ratio unit 272 schematically illustrated in FIG. 5 is formed as a gear drive, which has three gears like the transmission ratio unit in accordance with FIG. 1 and has a fixed transmission ratio condition, which can lie in the order of magnitude of four. With the illustrated exemplary embodiment, the one gear 240 is carried by the differential cage 255.

The friction clutches 236, 237 are disengaged and engaged corresponding to the existing operating conditions of the motor vehicle, so that the electrical machine 231, as described in connection with FIG. 1, can assume various functions, namely, for example, a generator function, a starter function, and/or a braking function.

In the illustrated exemplary embodiment, a flywheel 273 is provided between the internal combustion engine 270 and the electrical machine 231. That flywheel 273 can be formed as a rigid flywheel, or also can be formed as a so-called two-mass flywheel. When utilizing a two-mass flywheel, it can be advantageous if the rotor 235 can be connected through the clutch 236 with that flywheel mass that is non-rotatably connected with the internal combustion engine 270. The second flywheel mass, connected with the first flywheel mass through a torsional vibration damper, is then connected with the transmission input shaft 203.

In the schematic representation of a drive arrangement in accordance with FIG. 5, the adjusting mechanism 25 shown in FIG. 1 for the eccentric drive 205 is not shown. An adjusting mechanism of that type can be arranged in the embodiment in accordance with FIG. 5 in the region of the end of the shaft 203 facing away from the engine 270.

Switching the type of drive of the rotor 235, namely from the engine side or from the motor vehicle side, can also take place simply by utilizing two freewheels, which are connected in such a way that the rotor 235 can respectively be driven from the faster drive side.

The use of an electrical machine 31 or 231 as a brake made possible through the configuration of a drive arrangement in accordance with the invention enables a relief of the actual braking system of a motor vehicle, which is especially beneficial in descending a mountain.

When operating the electrical machine as a generator, it can be applied at least for supporting the normal braking system, as already mentioned. The energy generated produced thereby can also be utilized for heating the engine coolant, for example by installing an electrical heater in the radiator. In that way, kinetic energy of the motor vehicle can be reduced in a simple way. The temperature of the liquid coolant can be maintained in a simple way at a certain or still acceptable temperature by turning on the fan. In case it is needed, heat exchangers forming the radiator in motor vehicles of that type can be dimensioned larger, and a stronger fan or additional fans can be provided if necessary. At least a portion of the resulting braking energy can therefore—for example at low outside temperatures—be utilized by means of the electrical machine for more rapid heating of the liquid coolant of the engine and/or the interior space of the motor vehicle.

If necessary, an additional current consuming device can be added to dissipate the resulting excess electrical energy. Insofar as a separate starter motor is present, it can be connected and if need be put into operation so that it attempts to start the engine, therefore to pull it along, whereby nevertheless no fuel is delivered. Other consuming devices can also be utilized for the dissipation of energy, such as, for example, glow plugs, radiator blowers, windshield heaters, lighting, etc.

It can also be suitable if during normal travel the state of charge of the battery is kept at a level that enables storage of a certain amount of energy. That means, therefore, that during normal travel the state of charge of the battery is controlled such that a residual capacity in the battery is always reserved for braking energy.

As can be deduced from the preceding description, the drive arrangement in accordance with the invention or the transmission construction described enables the motor vehicle to start traveling from an "infinite" transmission ratio. Nevertheless no retarding torque can be transmitted through the connecting-rod-like connecting elements 7 because of the kinematics of the transmission. As likewise has already been described, components, which transmit the torque existing inside the transmission, can have a certain elasticity. Those components include, among others, the connecting elements or connecting rods 7. On the basis of those elasticities, the transmission 1 has the characteristic that the transmission ratio between shafts 3 and 4 is dependent upon transmitted torque with eccentricity in the region of the eccentric drive 5 constant.

In order to enable a trouble-free utilization of the transmission in accordance with a further concept of the invention, a control unit is utilized for the drive train or the transmission, in which the torque currently transmitted by the transmission is determined on the basis of the transmission ratio actually present on the transmission and the eccentricity actually present in the region of the eccentric drive 5. That actually present eccentricity is namely a measure for the theoretically existing, actual transmission ratio, namely that which would be present if practically no torque were being transmitted. Therefore, the existing torque is determined indirectly through the elastic deformations of components of the transmission taking place that bring about the previously-mentioned change in transmission ratio. The previously-mentioned parameters or values can be stored in a control unit in the form of a characteristic field or a characteristic curve, whereby in the control unit a signal representing the transmission ratio can also be processed. The transmission ratio can thereby be learned on the basis of the ratio between the rotational speed present at the transmission input side and the torque present at the transmission output side. A comparison between the engine rotational speed and the rotational speed of the output shafts or drive wheels of the motor vehicle is also possible.

The torque existing on the wheels can be continuously determined with such a method, even when the vehicle is standing. That is, as already mentioned, made possible through the fact that each eccentricity or each crank radius of the eccentric drive 5 can be associated with a corresponding torque.

The eccentricity actually present at the point of time in question or the momentary crank radius of the eccentric drive 5 can be determined in a simple way through the difference in the absolute angle of rotation between the shaft 3 and the adjusting shaft 16—relative to the stationary housing 2 or 33. That can take place, for example, in that rotational speed impulses of both shafts 3 and 16 are measured by incremental transmitters, and that by subtraction the relative rotation and therewith the angular position between both shafts 3 and 16 is determined. The transmitter wheel of the rotational speed measuring unit can thereby be provided directly on the adjusting motor 26 in an advantageous way. That has the advantage that the rotational speed measuring unit which is in series with the existing transmission ratio present between the adjusting motor 26 and both shafts 3, 16, through which a good resolution exists relative to the eccentricity to be determined, since the rotor of the adjusting motor 26 runs through a large rotation relative to the actual rotation between both shafts 3 and 16. In that way, a sufficiently precise measurement of the relative position between the individual components is ensured, even when utilizing a sensor wheel with comparatively few teeth.

A further possibility of determining the crank radius or the eccentricity in the region of the eccentric drive 5 lies in the fact that utilizing a rotational speed or rotation measuring unit that uses a position sensor that rotates with the adjusting motor 26 or the shafts 3, 16 and directly measures the rotation angle between both shafts 3, 16 or the components of the motor 26 that can rotate relative to one another. The signal representing the corresponding rotation can then be transmitted by radio or slip ring to the control device that processes that signal.

The position corresponding to a "zero" eccentricity between the adjusting shaft 16 or the driven shaft 3 and the eccentric components 12 can be determined on the basis of a rotation stop between the adjusting shaft 16 and the driven shaft 3. That determination can result in that the adjusting motor 26 rotates both shafts 3 and 16 in such a way that that stop becomes operative. It can thereby be suitable if the change in the eccentricity of the crank radius is determined simultaneously. In an advantageous way, the rotation stop operative between both shafts 3 and 16 can advantageously be adjustable.

When starting the motor vehicle, starting from an "infinite" transmission ratio, it is advantageous if the wheel torque present on the drive wheels is regulated corresponding to the driver's wishes through the eccentricity of the eccentric drive 5. Thereby the internal combustion engine can first be throttled through an appropriate control unit. Through such a method, it becomes possible that only first when the actual torque is smaller than the desired torque after driving away, a transition to the usual control strategies of automatic clutches can take place.

In order to ensure that an at least approximately constant eccentricity continues to exist on the eccentric drive 5 or an at least approximately constant gear ratio of the transmission is maintained, it can be advantageous to control the adjusting motor 26 impulse-like, whereby an undesired, automatic adjustment can be avoided. In an advantageous way, the frequency of the impulses can thereby be selected to be so high that possible small changes in transmission ratio occurring between two impulses are not detectable in the motor vehicle. Through such a method, the load on the adjusting motor 26 constructed as an electric motor can also be reduced. In that way it also becomes possible to operate the electric motor better as to the degree of efficiency.

To the extent it should be necessary to reduce or to influence the friction between the interengaging tooth systems 14 and 17, that can take place by means of the adjusting motor 26 in that that adjusting motor is controlled so that at least the shafts 3 and 16 are moved back and forth relative to each other, and, to be sure, preferably by such a small amount that a practically constant transmission ratio condition can be ensured. Those back and forth movements also make it possible to build up a lubricant film between the corresponding contact regions.

It can be especially advantageous if the motor vehicle equipped with a drive arrangement in accordance with the invention has a brake, for example an electrical parking brake, that is engaged when the motor vehicle is stationary and the accelerator is not actuated to avoid a twisting of the freewheels 9.

Furthermore, it can be especially advantageous if when slowing the motor vehicle the transmission ratio of the transmission is set somewhat shorter than that transmission ratio which would arise from the engine rotational speed and the driving speed with "zero" load. That somewhat shorter transmission ratio is thereby continually adapted to the driving conditions determined by the engine rotational speed and the driving speed. By deceleration of the motor vehicle, rolling to a stop or braking the motor vehicle are to be understood. The latter can be especially easily set through the previously-mentioned adjustment of the transmission ratio of the transmission, and the motor vehicle has the correct transmission ratio when gas is reapplied, that is, in reaccelerating the motor vehicle. To the extent that the previously-mentioned transmission ratio adjustment is not possible without something further in certain operating conditions of the motor vehicle, for example at a relatively rapid driving speed (above 80 km/h) and with an engine rotating at idle speed, it can be particularly suitable to regulate or control the engine rotational speed and/or the engine torque so that in rebuilding a driving torque that torque buildup takes place smoothly. A similar regulation or control is also suitable if the engine is shut down in slowdown phases of the motor vehicle.

In a motor vehicle with a drive system arranged in accordance with the invention, it can be advantageous if it has a control unit which enables a starting strategy as described below in connection with FIG. 9.

Figure 9:
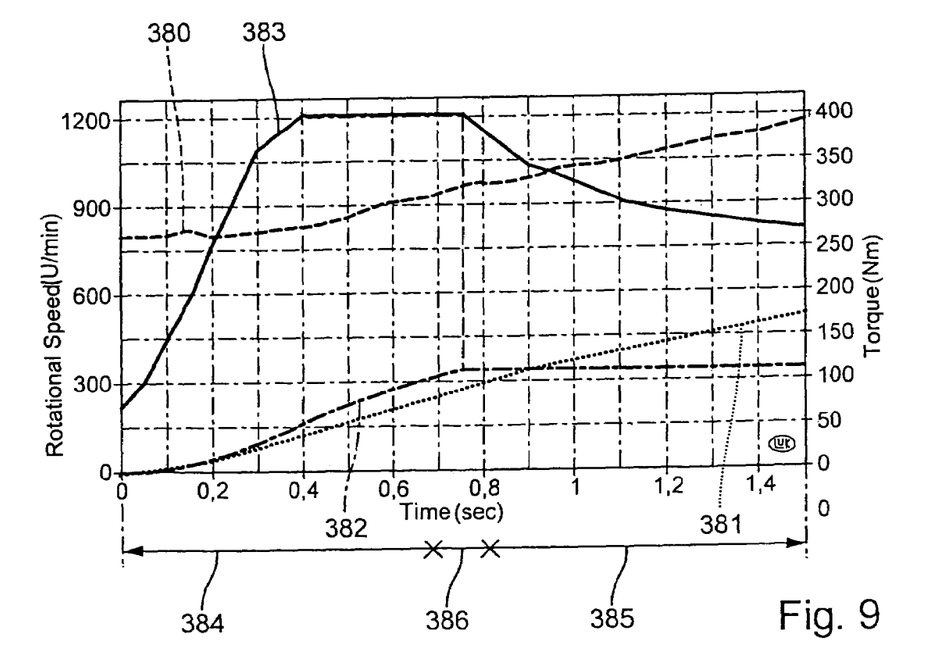

In the graph in accordance with FIG. 9, time is illustrated on the abscissa, on the left ordinate the wheel or engine rotational speed, on the right ordinate the wheel or engine torque.

The characteristic curve 380 represents the course of the engine rotational speed. The characteristic curve 381 represents the wheel rotational speed of the motor vehicle multiplied by 10. The characteristic curve 382 represents the course of the required engine torque, and the characteristic curve 383 corresponds to the torque course on the drive wheels.

It can be deduced from FIG. 9 that the starting process of a motor vehicle includes 3 partial regions, specifically of a first, 384, in which the wheel torque existing on the wheels is controlled, a second, 385, in which the engine rotational speed is regulated, as well as a third, so-called transition region 386, which is provided between the first and the second region. The transition region 386 can last more or less long depending upon the application case.

The torque 383 existing on the wheels in the first region 384 is set over time. The target values of the torques are stored in a characteristic field, whereby the selection from the characteristic field takes place corresponding to the driver's wishes. The momentary driver's wish can essentially be determined by the accelerator pedal angle and the speed of activation of the accelerator, therefore practically the desired amount of fuel. A correspondingly rapid operation of the accelerator is transformed into a correspondingly adapted torque buildup, and the reverse. The existing or possible rate of torque buildup in region 384 is essentially determined by the maximum speed of adjustment of the transmission 1.

The absolute target wheel torque arising during a startup process is derived from the accelerator angle, and indeed in such a way that a harmonious course of the wheel torque results during the transition to the second region 385 of the start up procedure.

By specifying the wheel torque over time, the necessary engine torque depends only on the actual transmission ratio over time. In that way, the engine torque is also dependent upon the rolling resistance and must be regulated corresponding to demand. If for example the rolling resistance is very high and the motor vehicle does not move despite applied wheel torque, then the gear ratio remains infinite and the necessary engine torque very small. If the rolling resistance is very small, for example in driving downhill, then the engine torque must be built up more rapidly. If deviations in wheel or engine torque arise, then either only one or both magnitudes, namely engine torque and transmission ratio, can be subsequently corrected. During a startup process, the engine rotational speed course 380 is oriented in agreement with the subsequent travel rotational speed. That means that the engine rotational speed does not show any overshoot in starting up, but rather approaches the target travel rotational speed in a freely selectable function. To the extent that an increase in rotational speed is desired in the first partial region 384, one can select the engine torque somewhat higher in order to attain an initial acceleration of the engine.

In the second region 385, the transmission is regulated according to the known regulation for stepless transmissions during a startup process. Thereby the engine rotational speed is essentially regulated by the transmission ratio of the transmission.

In order to obtain a harmonious course of torques and rotational speeds, control components can be reduced in transition region 386 and the regulation components can be utilized to a higher degree. The middle or the center of the transition region 386 lies at the position on which the necessary engine torque is as large as the maximum torque available from the engine at the moment, which is dependent upon the momentary rotational speed and the accelerator angle setting.

Insofar as the driver changes his desired torque during a startup process, a corresponding new operating point is directly approached. The speed or the period of time in which the new operating point is approached results from the speed of accelerator change, among other things.

The previously-mentioned starting strategy can especially be utilized in motor vehicles whose internal combustion engine is operated by means of a so-called electronic gas pedal, or by means of a gas pedal that is connected with the fuel supply system through an electronic unit. Furthermore, it is advantageous if a so-called interface exists between the internal combustion engine and the transmission.

With a so-called full-load start, the target torque existing on the wheel should essentially not be above a torque causing the wheels to slip. In an advantageous way, the engine rotational speed can immediately or very rapidly be driven to the maximum so that the full engine power is available from the equilibrium point of the two previously-mentioned torques.

With the startup strategy in accordance with the invention, the torque buildup can advantageously be initiated immediately with the incipient motion of the accelerator.

The patent claims submitted with the application are formulation proposals without prejudice for attaining more extensive patent protection. The applicant reserves the right to claim additional feature combinations previously disclosed only in the description and/or drawings.

References utilized in the dependent claims refer to the further development of the object of the main claim through the features of the respective dependent claim. They are not to be understood as a waiver of attaining an independent, objective protection for the feature combinations of the referred-to dependent claims.

Since the objects of the dependent claims could, with respect to the condition of the art on the priority day, form their own and independent inventions, the applicant reserves the right to make them the objects of independent claims or statements of division. They can furthermore also contain independent inventions, which have a configuration independent of the objects of the preceding dependent claims.

The exemplary embodiments are not to be understood as a restriction of the invention. Rather, numerous changes and modifications are possible in the framework of the present disclosure, especially such variants, elements and combinations and/or materials which can, for example, be deduced by the specialist with regard to the solution of the object by the combination or modification of individual features or elements or procedural steps in connection with the general description and embodiments as well as described in the claims or contained in the drawings, and which lead by combinable features to a new object or to new procedural steps or procedural step sequences, also to the extent that they concern manufacturing, testing and operating procedures.

What is claimed is:

1. A drive arrangement for a motor vehicle having at least one transmission driveable by an engine having a drive shaft and which transmission has a driven input shaft coupleable with the engine as well as at least one driven output shaft drivingly connected with the input shaft, said drive arrangement comprising: an eccentric drive provided on the input shaft, an actuation unit operatively connected with the eccentric drive for adjusting the eccentric drive, and a blockable freewheel unit provided on the output shaft, wherein the eccentric drive and the freewheel unit are connected with each other through at least one connecting element, and an electrical machine selectively drivingly connected through shiftable coupling means with one of the output shaft of the transmission, with the engine, and simultaneously with both the output shaft and the engine.

2. A drive arrangement in accordance with claim 1, wherein the electrical machine is connected with the output shaft of the transmission through a transmission ratio unit.

3. A drive arrangement in accordance with claim 1, wherein the electrical machine is connected with the engine at least during deceleration of the motor vehicle.

4. A drive arrangement in accordance with claim 1, wherein during driving conditions of the motor vehicle in which the electrical machine is connected with the output shaft of the transmission as well as with the engine torque flow between the output shaft and the engine is conducted through the electrical machine.

5. A drive arrangement in accordance with claim 1, wherein a connection of the electrical machine with the output shaft of the transmission takes place during deceleration of the motor vehicle.

6. A drive arrangement in accordance with claim 1, wherein during deceleration of the motor vehicle the electrical machine is driven by means of the transmission ratio unit from the output shaft of the transmission.

7. A drive arrangement in accordance with claim 6, wherein during deceleration of the motor vehicle, the engine is driven by connection of the electrical machine from the output shaft of the transmission.

8. A drive arrangement in accordance with claim 1, wherein the electrical machine is drivingly connected with the output shaft of the transmission through a fixed transmission ratio stage.

9. A drive arrangement in accordance with claim 1, wherein the electrical machine has a transmission-ratio-free connection with the engine.

10. A drive arrangement in accordance with claim 1 wherein the electrical machine is operable as a generator.

11. A drive arrangement in accordance with claim 1, wherein the electrical machine is operable as a motor and as a generator.

12. A drive arrangement in accordance with claim 1, wherein the electrical machine is operable as a starter for the engine and as a generator.

13. A drive arrangement in accordance with claim 1, wherein the electrical machine is operable for energy recuperation at least during deceleration of the motor vehicle.

14. A drive arrangement in accordance with claim 1, wherein the electrical machine is operable as a driving engine for the motor vehicle.

15. A drive arrangement in accordance with claim 1, wherein the electrical machine is disposed coaxially to the input shaft of the transmission.

16. A drive arrangement in accordance with claim 1, wherein the electrical machine is disposed on a side of the input shaft of the transmission facing away from the engine.

17. A drive arrangement in accordance with claim 1, wherein the electrical machine is disposed axially between the engine and the transmission.

18. A drive arrangement in accordance with claim 13, wherein energy developed during recuperation operation of the electrical machine is dissipated by means of a cooling system of the engine.

19. A drive arrangement in accordance with claim 2, wherein the transmission ratio unit provided between the output shaft of the transmission and the electrical machine rotates the engine and the electrical machine at their maximum rotational speed at the highest speed of the motor vehicle.

20. A drive arrangement in accordance with claim 2, wherein the transmission ratio unit between the output shaft of the transmission and the electrical machine is operable at the maximum speed of the motor vehicle to rotate the electrical machine at a rotational speed which is greater than the rotational speed of the engine at its highest power output.

21. A drive arrangement in accordance with claim 1, wherein the driving connection between the electrical machine and the output shaft of the transmission and the driving connection between the electrical machine and the engine each take place through a the freewheel unit.

22. A drive arrangement in accordance with claim 21, including a pair of freewheels connected to drive the electrical machine by a momentarily faster drive.

23. A drive arrangement in accordance with claim 1, wherein the shiftable coupling means are connected to drive the electrical machine by the momentarily faster drive.

24. A drive arrangement in accordance with claim 1, wherein the actuation unit for adjusting the eccentric drive is coaxial to a rotor of the electrical machine.

25. A drive arrangement in accordance with claim 1, wherein the actuation unit is arranged at least partially within the at least partially tubular formed rotor of the electrical machine.

26. A drive arrangement in accordance with claim 24, wherein the actuation unit includes at least one electric motor.

27. A drive arrangement in accordance with claim 1, wherein the eccentric drive includes a guide region arranged eccentrically relative to the axis of rotation of the input shaft, on which an eccentric component is rotatably supported, and on which the connecting element is rotatably supported.

28. A drive arrangement in accordance with claim 27, wherein the drive shaft includes an axial recess in which an adjusting shaft engages, through which the eccentric component is rotatable on the guide region.

29. A drive arrangement in accordance with claim 27 the eccentric component includes a recess for receiving the guide region.

30. A drive arrangement in accordance with claim 29, characterized in that the eccentric component has an inner tooth system in the region of the recess.

31. A drive arrangement in accordance with claim 30, wherein the eccentric component is carried on the guide region by a section of the inner tooth system bounding the addendum circle of the tooth system.

32. A drive arrangement in accordance with claim 28, wherein the adjusting shaft has an outer tooth system.

33. A drive arrangement in accordance with claim 32, wherein the adjusting shaft is supported in the recess of the drive shaft by the section forming the addendum circle of its outer tooth system.

34. A drive arrangement in accordance with claim 32, wherein the inner tooth system of the eccentric component is in engagement with the outer tooth system of the adjusting shaft.

35. A drive arrangement in accordance with claim 28, wherein the adjusting shaft is rotatable relative to the drive shaft and one rotation of the adjusting shaft produces a rotation of the eccentric component on the guide region.

36. A drive arrangement in accordance with claim 1, wherein at least two eccentric drives are provided on the drive shaft arranged one after the other.

37. A drive arrangement in accordance with wherein the freewheel unit provided on the output shaft has an outer ring on which a connecting element associated with that freewheel unit is swingably articulated.

38. A drive arrangement in accordance with claim 28, wherein the axis of rotation of the adjusting shaft and the axis of rotation of the drive shaft are concentric.

39. A drive arrangement in accordance with claim 28, wherein rotation of the adjusting shaft relative to the drive shaft takes place through an adjusting motor provided at an end of the drive shaft and associated with the actuation unit.

40. A drive arrangement in accordance with claim 39, wherein one end of the drive shaft is connected with an internal combustion engine and the adjusting motor is positioned in the region of an opposite end.

41. A drive arrangement in accordance with claim 39, wherein the adjusting motor is coaxial to the drive shaft.

42. A drive arrangement in accordance with claim 39, wherein the adjusting motor has a driving connection with the drive shaft and the adjusting shaft.

43. A drive arrangement in accordance with claim 39, wherein the adjusting motor associated with the actuation unit rotates with the drive shaft.

44. A drive arrangement in accordance with claim 39, including a transmission ratio gear unit positioned between at least one of the drive shaft and adjusting shaft, and the adjusting motor.

45. A drive arrangement in accordance with claim 44, wherein the transmission ratio gear unit includes at least one planetary gear set.

* * * * *